US006255798B1

(12) United States Patent
Obara et al.

(10) Patent No.: US 6,255,798 B1
(45) Date of Patent: *Jul. 3, 2001

(54) CONTROL APPARATUS FOR ELECTRIC VEHICLE

(75) Inventors: Sanshiro Obara, Tokai-mura; Ryoso Masaki; Yuusuke Takamoto, both of Hitachi; Eiichi Ohtsu, Mito; Hiroyuki Yamada, Hitachinaka, all of (JP)

(73) Assignees: Hitachi, Ltd., Tokyo; Hitachi Car Engineering Co., Ltd., Hitachinaka, both of (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/736,346

(22) Filed: Oct. 23, 1996

(30) Foreign Application Priority Data

Oct. 30, 1995 (JP) ................................... 7-281287

(51) Int. Cl.[7] ........................................... H02D 5/34
(52) U.S. Cl. ..................... 318/802; 318/722; 318/724; 318/432; 318/809; 318/811
(58) Field of Search ...................... 318/727–818, 318/700–724, 432, 434

(56) References Cited

U.S. PATENT DOCUMENTS

| 4,680,526 | * | 7/1987 | Okuyama et al. | 318/802 |
| 5,278,485 | * | 1/1994 | Kim | 318/802 |
| 5,481,173 | * | 1/1996 | Yamamoto | 318/801 |
| 5,559,419 | * | 9/1996 | Jansen et al. | 318/808 |
| 5,598,081 | * | 1/1997 | Okamura et al. | 318/801 |
| 5,652,495 | * | 7/1997 | Narazaki et al. | 318/716 |

FOREIGN PATENT DOCUMENTS

| 34 28 189 | 2/1986 | (DE) . |
| 37 44 985 | 8/1988 | (DE) . |
| 40 36 842 | 5/1991 | (DE) . |

(List continued on next page.)

OTHER PUBLICATIONS

*IEEE Transactions on Industry Applications*, vol. 30, No. 6, 1994, pp. 1632–1637 entitled "Effects and Compensation of Magnetic Saturation in Flux–Weakening Controlled Permanent Magnet Synchronous Motor Drives" by S. Morimoto et al.

Thesis 1982, TU Braunschweig, pp. 66–69, 86–89 entitled Feldorientierte Regelung einer Asynchronmaschine mit einem Mikrorechner by R. Gabriel.

(List continued on next page.)

*Primary Examiner*—David Martin
(74) *Attorney, Agent, or Firm*—Crowell & Moring, L.L.P.

(57) ABSTRACT

A more compact and light-weight drive unit is required for an electric vehicle in order to improve its mileage per charge, acceleration performance and overall efficiency. A control apparatus which generates drive signals to drive power devices in the power converter includes: a current reference generator calculates from a torque reference value a d-axis exciting current reference value on the basis of which the ac motor generates a magnetic flux, and a q-axis torque current reference value, the d-axis and the q-axis being orthogonal to each other; a current control circuit generates ac voltage reference values Vu*, Vv* and Vw* from the d-axis exciting current reference value and the q-axis torque current reference value; and a drive signal generator generates drive signals to drive power devices from the ac voltage reference values. Both the current reference generator and the current control circuit are processed digitally by the same arithmetic unit.

5 Claims, 7 Drawing Sheets

FOREIGN PATENT DOCUMENTS

| | | |
|---|---|---|
| 3-284184 | 12/1991 | (JP) . |
| 6-121405 | 4/1994 | (JP) . |
| 6-133558 | 5/1994 | (JP) . |
| 6-178575 | 6/1994 | (JP) . |
| 6-189578 | 7/1994 | (JP) . |
| 6-225573 | 8/1994 | (JP) . |
| 7-212901 | 8/1995 | (JP) . |
| 7-284300 | 10/1995 | (JP) . |

OTHER PUBLICATIONS

Thesis 1985, TU Braunschweig, pp. 80–95 entitled Mikrorechner—Geregelter Asynchron–Stellantrieb by W. Schumacher.

"Development of Drive System for Electric Vehicles" by K. Watanabe et al. in *1995 National Convention Record I.E.E. Japan—Industry Application Society*, pp. 29 to 30, 215 to 218.

\* cited by examiner

CONTROL APPARATUS FOR ELECTRIC VEHICLE

BACKGROUND OF THE INVENTION

The present invention relates to a control apparatus for controlling an electric vehicle, and in particular, it relates to a control apparatus for controlling power devices in a power converter which supplies power to an ac motor for driving the electric vehicle in which the power devices are driven by a digital actuating signal.

Many of the prior art control apparatuses for driving an ac motor, whether an induction motor or a synchronous motor which uses permanent magnets, in practice utilize the vector control method which divides a motor current into a torque current Iq and an exciting current Id in order to control the motor. Various control methods utilizing the vector control method have been proposed for the purpose of improving static and dynamic characteristic control performances and the like. For example, in JP-A-6-178575, timing control between an exciting current reference and a torque current reference is disclosed for improving such control characteristics.

For a drive unit including a motor and a power converter for driving an electric vehicle, it is essential that it be compact in size and light-weight in order to satisfy the requirement of improving the mileage per charge of a battery. In order to satisfy such a requirement for compactness and light-weight, it becomes necessary to increase its motor speed, for example, over several thousand revolutions per minute as well as frequencies of its power converter, for example, over several hundred Hz. As disclosed in the above-mentioned prior art JP-A-6-178575, it is a general practice to compute reference values of the torque current and exciting current using a microcomputer for motor current control in a control unit which produces a drive signal to drive power devices in the power converter which supplies power to the ac motor. However, since a number of electronic components are required such as logic circuits, operation amplifiers and the like, in addition to the microcomputer, increases in size and weight of the control unit cannot be avoided according to the prior art, thereby preventing realization of the requirements for compactness and light-weight of the drive unit.

SUMMARY OF THE INVENTION

An object of the present invention is to provide a compact and light-weight control apparatus which produces a drive signal to power devices in the power converter which supplies power to an ac motor for driving the electric vehicle.

The object of the invention can be accomplished by providing such a control apparatus for producing a drive signal to power devices in the power converter which supplies power to the ac motor for driving the electric vehicle that is comprised of: a current reference generator which calculates a d-axis exciting current reference value, according to which a magnetic flux of the ac motor is generated in response to a torque reference value which the ac motor desires to produce, and a q-axis torque current reference value, where the d-axis and the q-axis are orthogonal to each other; a current control unit which produces each ac voltage reference value on the basis of the d-axis exciting current reference value and the q-axis torque current reference value; and a PWM signal generation unit for driving the power devices in response to the ac voltage reference values, wherein the current reference generator and the current control unit are controlled by a single arithmetic unit in a digital mode.

The aforementioned current control unit of the invention includes: a three-to-two phase converter which obtains from a motor current each feedback value relative to the d-axis exciting current reference value and the q-axis torque current reference value; a d-axis exciting current control unit which calculates a d-axis exciting voltage reference value from a difference between the d-axis exciting current reference value and the d-axis exciting current actually obtained; a q-axis torque current control unit which calculates a q-axis torque voltage reference value from a difference between the q-axis torque current reference value and the q-axis torque current actually obtained; a two-to-three phase converter for converting the d-axis exciting voltage reference value and the q-axis torque voltage reference value into each ac voltage reference value; further a d-axis and q-axis voltage compensation unit for compensating the d-axis exciting voltage and the q-axis torque voltage reference value; and an ac voltage compensation unit for compensating the ac voltage reference value.

PREFERRED EMBODIMENTS

The preferred embodiments of the invention will be described in the following with reference to the accompanying drawings.

Figure 1:
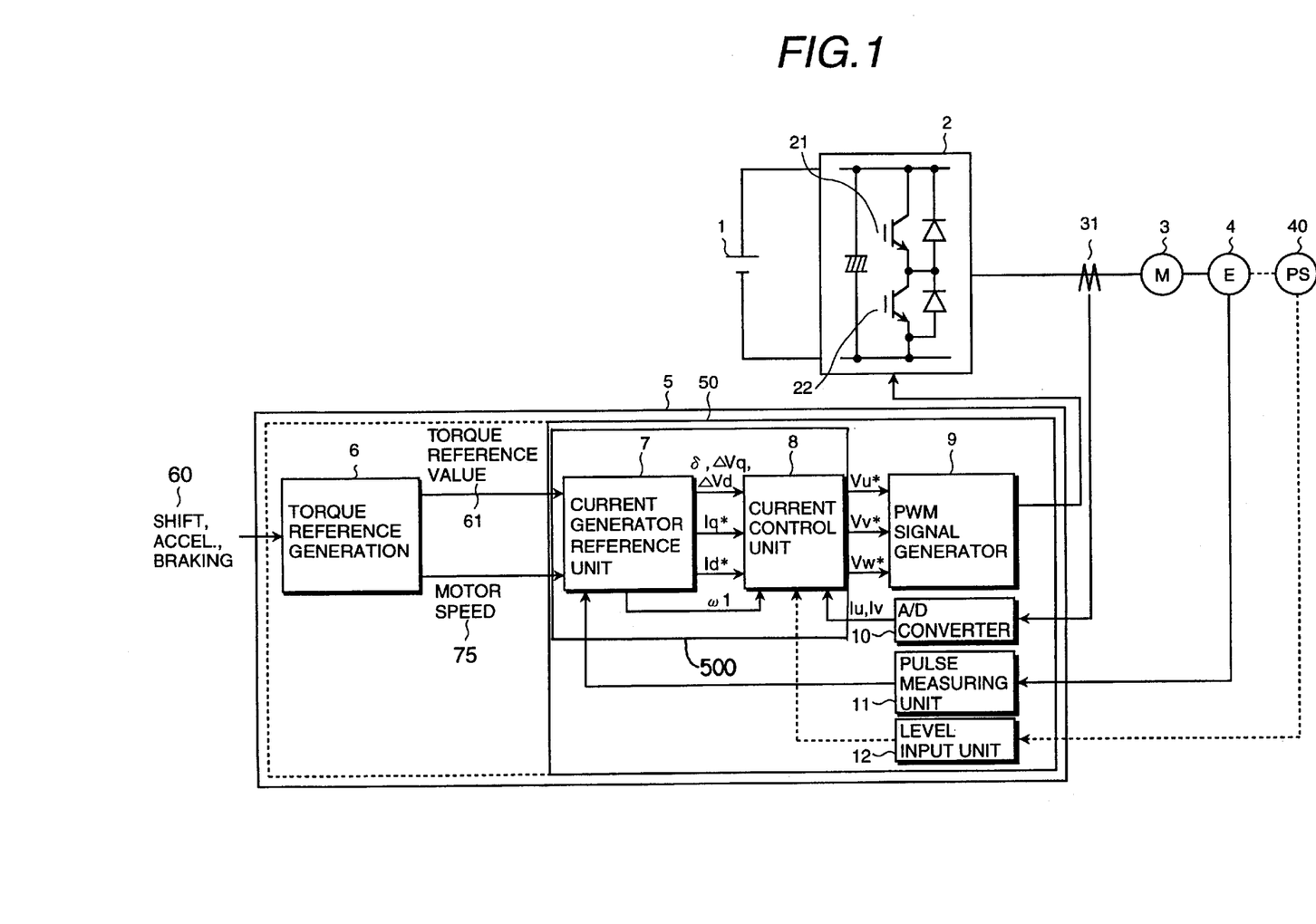
FIG. 1 is a schematic block diagram of a control apparatus for controlling an electric vehicle of the invention.
Figure 2:
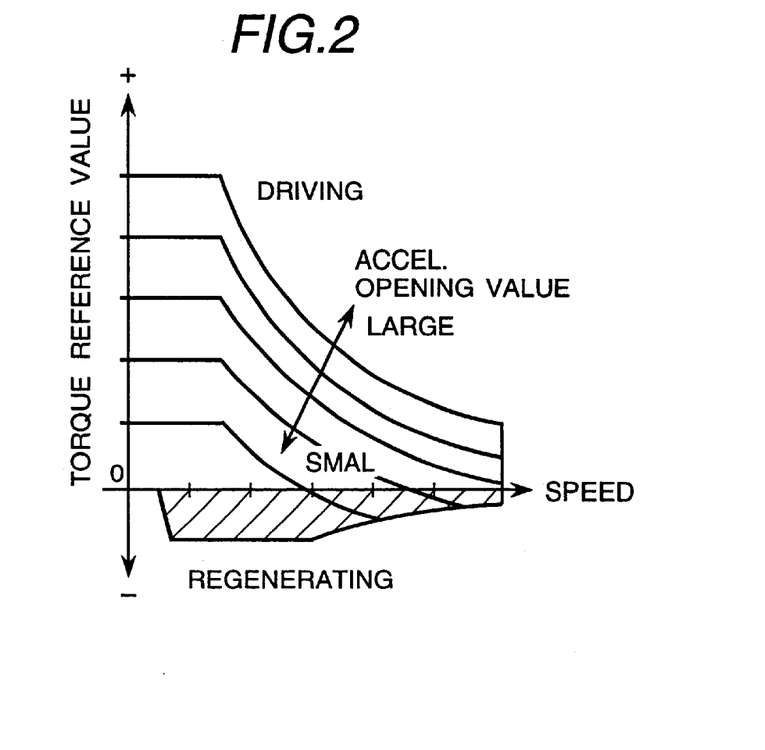
FIG. 2 is a diagram indicating characteristics of torque reference values of torque reference generator 6 of the invention.

In the drawings of FIGS. 1 and 2, numeral 1 depicts a main battery 1 which is a power source of the electric vehicle, 2 depicts a power converter for converting a dc voltage into an ac voltage using power devices 21, 22 such as an insulated gate bipolar transistors (IGBT) or the like, 3 depicts an ac motor which is an induction motor or a permanent magnet type synchronous motor, 31 depicts a current detector for detecting a current in the motor 3, and 4 depicts an encoder which detects a speed of the motor 3. Numeral 5 depicts a control apparatus for controlling the above-mentioned power converter, which is comprised of: torque reference generator 6 which, in response to vehicle signals 60 responsive to a shift gear position, accelerator pedal position and brake pedal depression quantity as well as motor speed signal 61a from the motor 3, calculates torque reference value 61 for the motor 3 on the basis of accelerator opening and speed signal 61a; a current reference generator 7 which, on the basis of torque reference value 61 from the torque reference generator 6 and calculated speed information from a pulse measuring unit 11 which calculates pulses detected by encoder 4, carries out a vector control calculation and produces d-axis exciting current reference value Id* and q-axis torque current reference value Iq* for the motor 3, as well as produces a primary angular frequency ω1, ΔVq, ΔVd to current control unit 8, and torque angle δ to a dead-time compensator 87; current control unit 8 which, on the basis of reference values of the Id* and Iq* and in accordance with ω1, torque angle δ, compensation voltages ΔVq, ΔVd, and as well as on the basis of motor currents Iu, Iv obtained from A/D converter 10, produces ac voltage reference values Vu*, Vv* and Vw*; and drive signal generator 9 (hereinafter, referred to as a PWM signal generator) which, on the basis of these voltage reference values described above, produces a PWM signal to drive power devices 21, 22 in the power converter 2 in a pulse width modulation mode. The above-mentioned A/D converter 10 carries out analog-to-digital conversion of a motor current from the motor 3, and the pulse measuring unit 11 which measures pulse signals detected by the encoder 4 has a built-in timer for measuring each time of occurrence of each pulse.

A main component of control apparatus 5 of the invention includes, in addition to the arithmetic processing units which execute various control calculations, a single chip microcomputer (hereinafter referred to as a microcomputer) having built-in peripherals such as A/D converter 10, pulse measuring unit 11, timer and the like. Thereby, outputs of current reference generator 7 and current control unit 8 in FIG. 1 are calculated by a single processor 500, and processings of PWM signal generator 9, A/D converter 10 and pulse measuring unit 11 are processed by a peripheral processing module integrated on the single chip microcomputer.

In the following description of this embodiment of the invention, it is assumed that processing of torque reference generator 6 is processed by a separate microcomputer. In response to a shift gear signal of vehicle signals 60 and a speed signal 61a of the motor 3, torque reference generator 6 produces torque reference value 61 in accordance with respective characteristics as indicated in FIG. 2. The drawing of FIG. 2 depicts torque reference characteristics in a drive range, in which the positive side of the x-axis indicates driving operation and the negative side thereof indicates the regenerating operation which is represented by a shadowed area.

Figure 3:
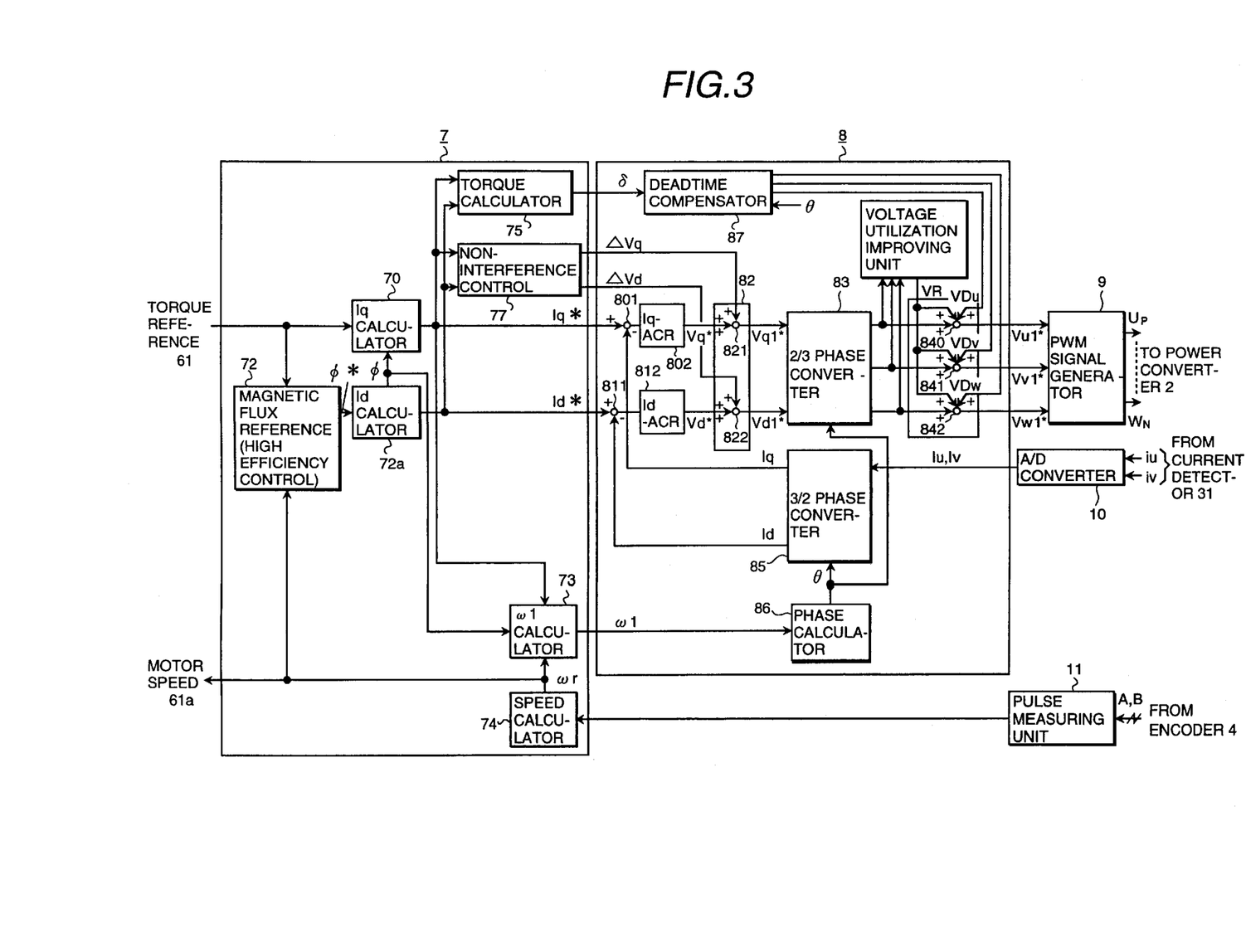
FIG. 3 is a process diagram configuration of a microcomputer which constitutes the control apparatus for the electric vehicle according to the invention.

A block diagram which indicates processings of current reference generator 7 and current control unit 8 which are to be processed by a single control processor such as a microcomputer is indicated in FIG. 3.

Current reference generator 7 will be described in detail by way of example which utilizes an induction motor as the motor 3. Torque Tm generated by the induction motor will be given by the following equation (1).

$$Tm = Kt \cdot \phi \cdot Iq \tag{1}$$

$$Iq^* = Kt \cdot Tm^*/\phi \tag{2}$$

$$Id^* = \phi/Lm \tag{3}$$

$$\omega s = Ks \cdot Iq^*/\phi \tag{4}$$

$$\omega 1 = \omega s + \omega r \tag{5}$$

where Kt and Ks are constants, and Lm is an excitation inductance.

A q-axis torque current Iq* is obtained in Iq calculator 70 using the above-mentioned equation (2), in which torque reference value Tm* is substituted with Tm of equation (1). A d-axis exciting current Id* is obtained in Id calculator 72a in response to secondary magnetic flux reference value φ* from magnetic flux reference unit 71 according to above equation (3) using secondary magnetic flux value φ and Lm indicative of a non-linear characteristic. Secondary magnetic flux φ is obtained in Id calculator 72a from magnetic flux reference value φ* taking into account a secondary magnetic circuit model of the motor 3. A primary angular frequency ω1 is obtained using equation (5) in Id calculator 73 from slip angular frequency ωs of equation (4) and from ωr which is obtained in speed calculating unit 74 in response to a signal from encoder 4.

Figure 4:
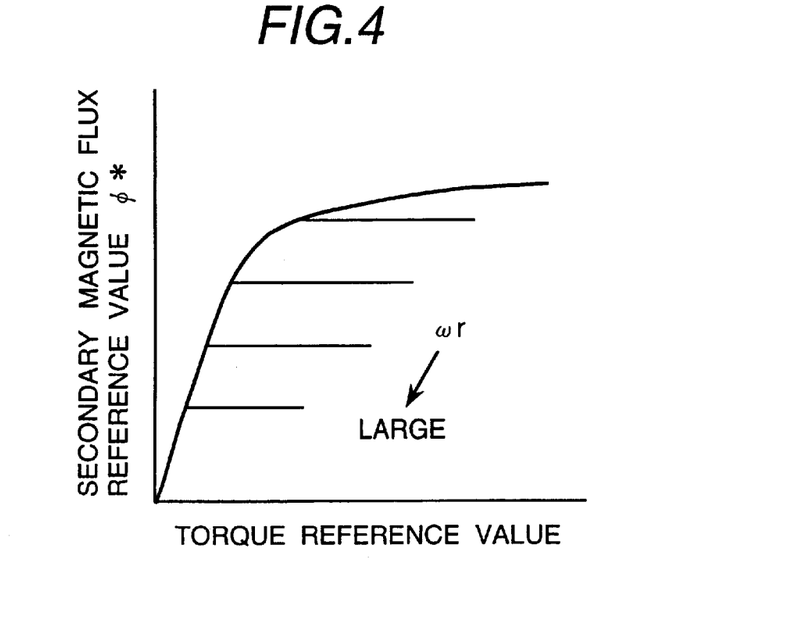
FIG. 4 is a characteristic diagram of secondary magnetic flux reference values φ* from magnetic flux reference unit 71 for carrying out a high efficiency control.

Further, magnetic flux reference unit 72 outputs secondary magnetic flux reference value φ* for controlling motor 3 to operate at a high efficiency at each operating point. φ* is obtained from torque reference value 61 and is compensated by rotation speed ωr as indicated in FIG. 4.

Speed calculator 74 calculates ωr from pulse signal M per unit time obtained from pulse measuring unit 11 and a measuring time T for measuring the pulse signal using the following equation (6), $$\omega r = K\{[M(n)-M(n-1)]/[T(n)-T(n-1)]\} \tag{6}$$

where, K is a constant, and (n−1) depicts a time prior to time (n).

Through the processing as described above, current reference generator 7 produces Id*, Iq* and ω1.

Further, torque angle calculator 75 calculates torque angle δ for dead time compensator 87 to carry out dead time compensation, on the basis of d-axis exciting current reference value Id* and q-axis torque current reference value Iq* using equation (7).

$$\delta = \tan^{-1}(Iq^*/Id^*) \tag{7}$$

Now, the non-interference control according to the invention will be described in the following. The d-axis exciting current Id in the motor 3 is caused to flow by d-axis exciting voltage Vd across its own axis and a voltage component related to q-axis torque current Iq across another axis q, and the q-axis torque current is caused to flow by q-axis torque voltage Vq across its own axis and a voltage component related to the d-axis exciting current Id across the other d-axis. The influence of this other voltage component applied across this other axis is represented by the term in the equations which depends on the primary angular frequency ω1 which is related to the number of revolutions. Thereby, it becomes necessary to eliminate the influence of the component by the other axis in order to improve controllability. Thereby, non-interference control unit 77 is provided to execute computation as expressed by equations (8) and (9) to produce compensating voltages ΔVd and ΔVq to current control unit 8.

$$\Delta Vd = -\omega 1 \cdot L \cdot Iq \tag{8}$$

$$\Delta Vq = \omega 1 \cdot L \cdot Id + \omega 1 \cdot \phi \tag{9}$$

where, L is a leakage inductance.

In the following, current control unit 8 will be explained. Numeral 801 is an adder which calculates a deviation between q-axis current reference value Iq* and a detected value of q-axis current Iq obtained through A/D converter 10 on the basis of motor currents iu, iv and through a three-to-two phase converter 85. A combination of adder 801 and compensation control unit 802 (depicted by Iq-ACR) which carries out proportional integral (PI) compensation processing constitute a q-axis exciting current control unit.

Likewise, numeral 811 is an adder which calculates a deviation between d-axis current reference value Id* and a detected value of d-axis current Id obtained through A/D converter 10 on the basis of motor currents iu, iv, and through the three-to-two phase converter. A combination of adder 811 and compensation control unit 812 which carries out PI compensation processing (indicated by Id-ACR) constitutes a d-axis exciting current control unit. The aforementioned compensation control units 802 and 812 output d-axis and q-axis voltage reference values Vd* and Vq*, respectively. In response to these Vd* and Vq*, a d-axis and q-axis voltage compensation unit 82 executes a non-interference control processing according to equations (8) and (9) to add a voltage compensation of equations (10) and (11) as follows, and outputs new d-axis and q-axis voltage reference values Vd1* and Vq1*.

$$Vd1^* = Vd^* + \Delta Vd \tag{10}$$

$$Vq1^* = Vq^* + \Delta Vq \tag{11}$$

Then, these d-axis and q-axis voltage reference values Vd1* and Vq1* are converted into three phase ac voltage reference values Vu*, Vv* and Vw* respectively in a two-to-three phase converter 83.

Further, in ac voltage compensation unit 84, on the basis of compensating voltage Vr and a torque angle calculated in voltage modulation unit 88 provided for improving voltage utilization factor, and in response to ac voltage reference values Vu*, Vv* and Vw*, adders 840, 841 and 842 add up compensating voltages VDu, VDv and VDw which are calculated in dead time compensation unit 87 as expressed by equations (12), (13) and (14), and produce updated ac voltage reference values Vu1*, Vv1* and Vw1* to a PWM signal generator 9.

$$VuR = Vu^* + VR, \quad Vu1^* = VuR + VDu \tag{12}$$

$$VvR = Vv^* + VR, \quad Vv1^* = VvR + VDv \tag{13}$$

$$VwR = Vw^* + VR, \quad Vw1^* = VwR + VDw \tag{14}$$

Figure 5:
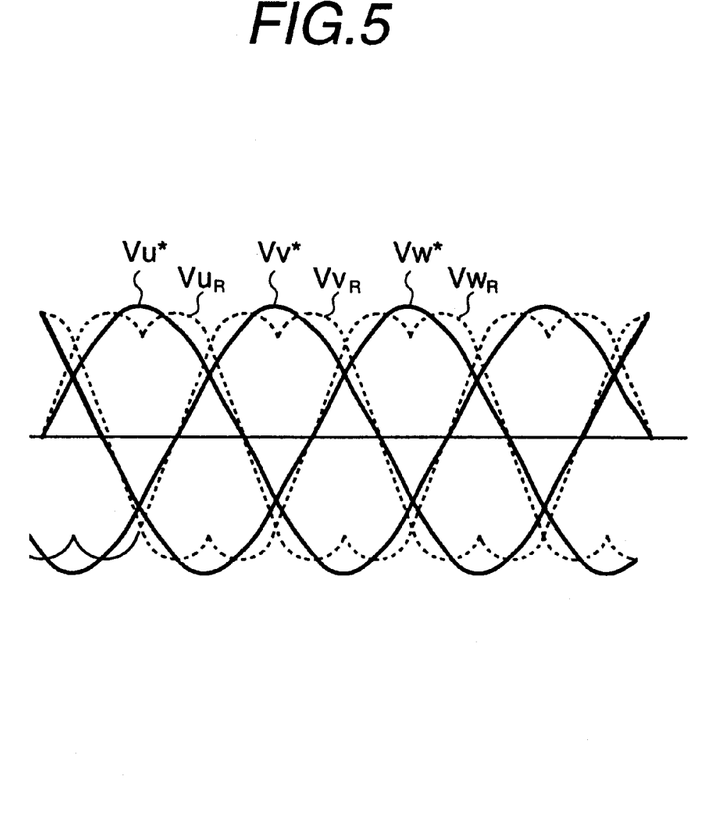
FIG. 5 is an operational diagram indicative of voltage modulation unit in current control unit 8 for improving voltage utilization factor.

Voltages VuR, VvR and VwR compensated by voltage modulation unit 88 for improving the voltage utilization factor are shown respectively by broken lines in FIG. 5. As a method for improving the voltage utilization factor, there is one such, for example, which compensates with a value of −½ of a difference between a maximum value and a minimum value of an input voltage. Provision of voltage modulation unit 88 is required for improving an output voltage from power converter 2.

Figure 6:
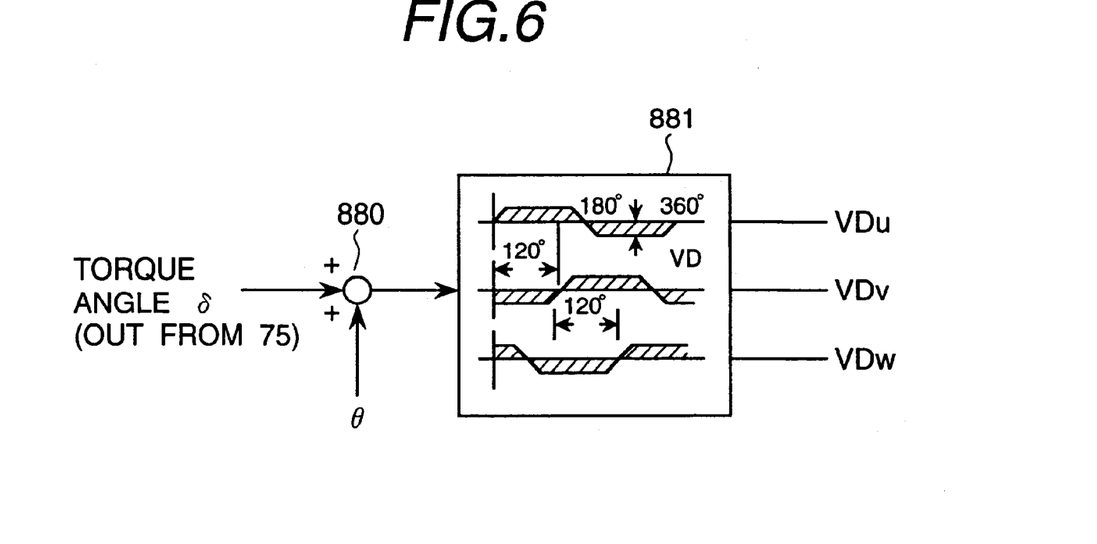
FIG. 6 is an operational diagram of dead-time compensator 87 in current control unit 8.

Further, in dead time compensator 87, torque angle δ and ac signal phase θ of ac voltages or the like are added in adder 880 as shown in FIG. 6. From table 881 of FIG. 6, on the basis of this phase, dead time compensation voltage VD is output as compensating voltages VDu, VDv and VDw, respectively. Provision of dead time compensation unit 87 is necessary for improving a motor current distortion due to a dead time required for preventing short circuit in power devices.

Phase angle θ which is necessary for two-to-three phase converter 83 and three-to-two phase converter 85 is supplied from phase calculator 86 which in response to primary angular frequency ω1 calculated in ω1 calculation unit 73 executes integral processing and produces its output to the two-to-three phase converter and the three-to-two phase converter, respectively.

In response to these updated ac voltage reference values Vu1*, Vv1* and Vw1*, PWM signal generator 9, which is a peripheral processing unit, carries out comparison operation to compare its carrier signal in a chopping waveform with these updated voltage reference values, and generates PWM signals Up and Wn to drive power devices in power converter 2.

Figure 7:
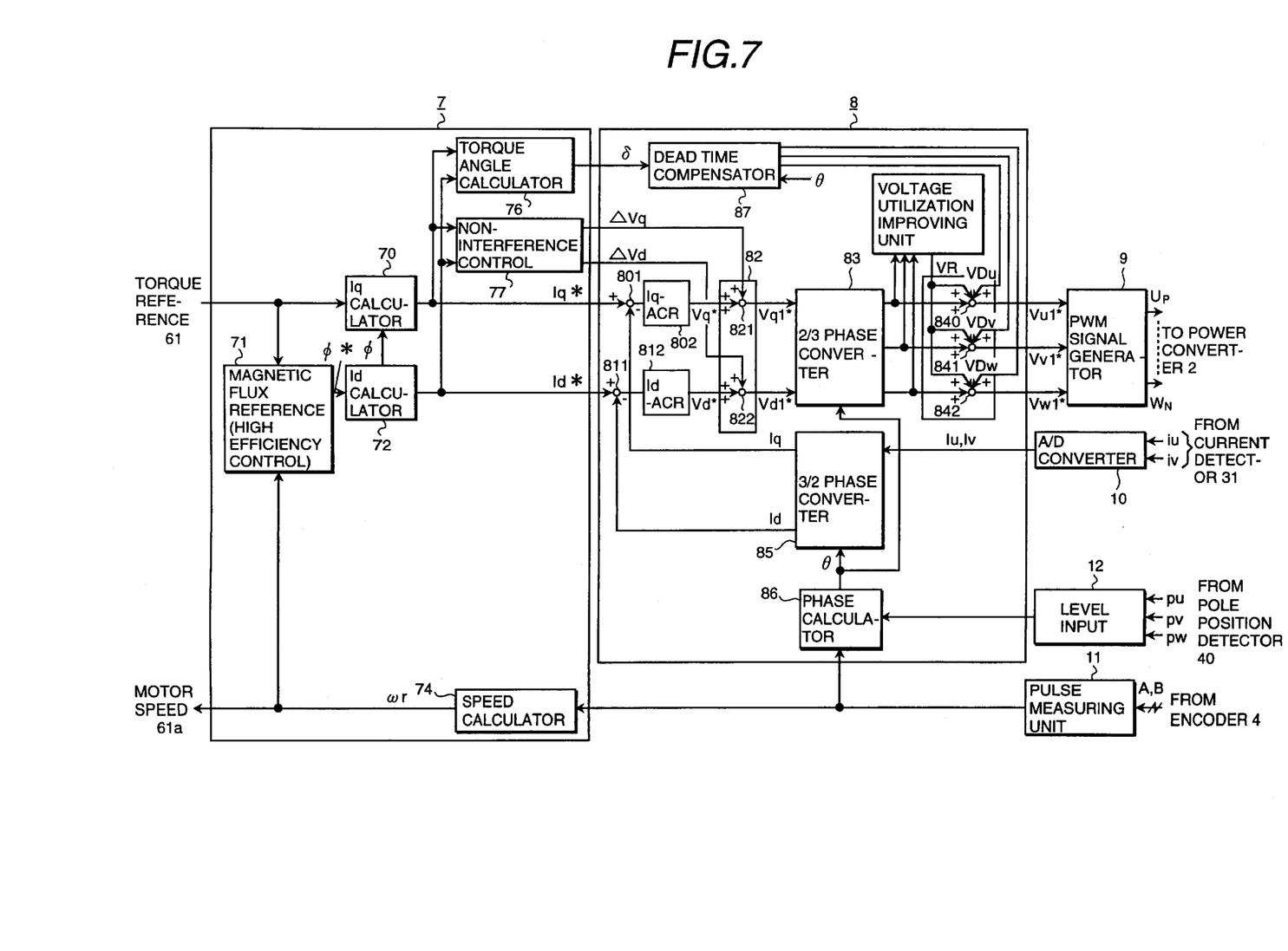
FIG. 7 is a process diagram indicating processing of respective units by a microcomputer constituting a control apparatus for controlling the electric vehicle in the case where motor 3 is a permanent magnet type synchronous motor.

Further, in the case where motor 3 is a permanent magnet type synchronous motor, provision of a pole sensor (PS) 40 which is indicated by broken lines in FIG. 1 is required. FIG. 7 is a block diagram indicative of current reference generator 7 and current control unit 8 in an arrangement of such a case. A major difference from the case of the induction motor resides in a method of calculating phase angle θ which is required for two-to-three phase converter 83 and three-to-two phase converter 85. In the case of the induction motor, each primary frequency ω1 output from current reference generator 7 is integrated in phase calculator 86 thereby to output θ. However, in the case of the synchronous motor of FIG. 7, phase angle θ is directly calculated on the basis of a signal which is obtained via level input unit 12 which is a peripheral processing module on a microcomputer which enters signals PU, PV and PW from pole sensor 40, and of a signal of rotational angle from encoder 4. Thereby, there is no need for provision of ω1 calculation unit 73 of FIG. 3.

Figure 8:
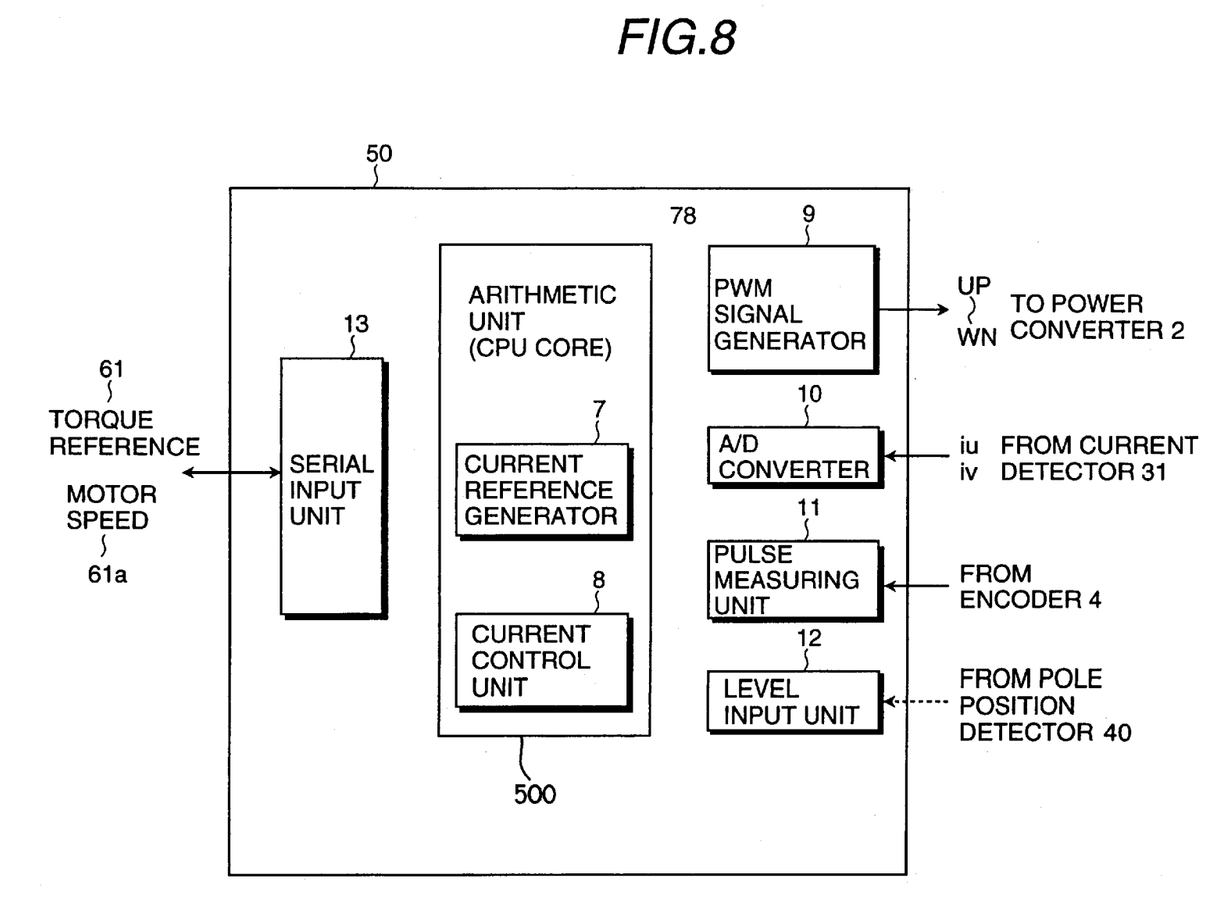
FIG. 8 is a block diagram indicative of a hardware architecture of a microcomputer which constitutes the control apparatus of the invention.

Processing of each unit shown in FIG. 1 is handled by a microcomputer 50 as indicated in FIG. 8, wherein the processing of the PWM signal generator 9 to serial input unit 13 in the drawing of FIG. 8 are executed by peripheral processing modules 9 to 13 on the microcomputer 50, while processings of current reference generator 7 and current control unit 8 are executed by a central processing unit or CPU core 500.

Figure 9:
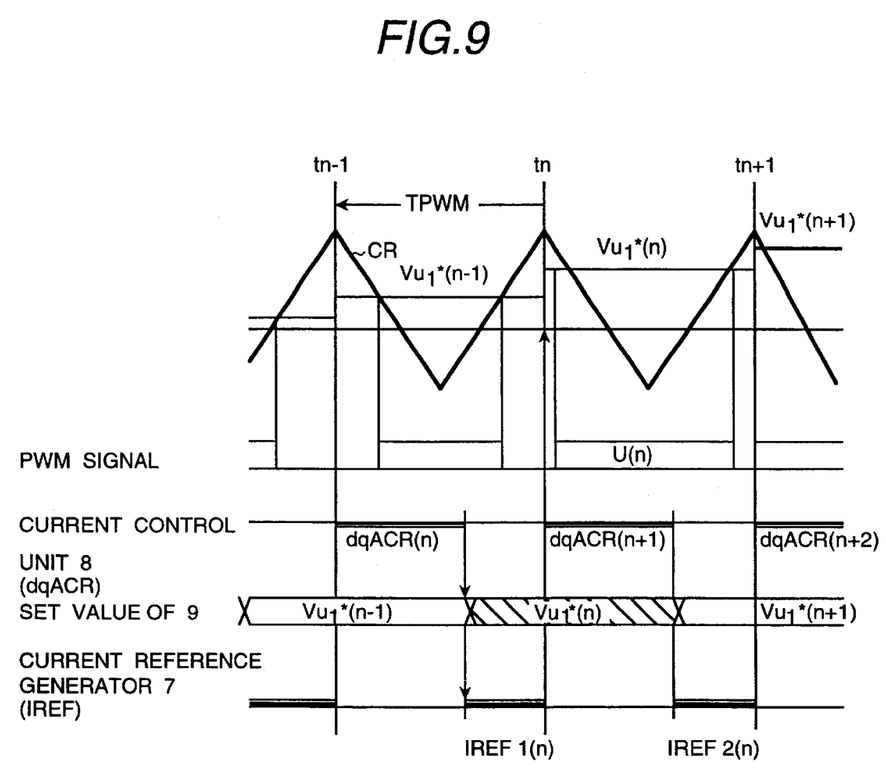
FIG. 9 is a process time chart of operations of current reference generator 7 and current control unit 8 which are processed by the same arithmetic unit.

These units are processed at cycle times as indicated in FIG. 9. PWM signal generator unit 9 which generates therein a carrier wave of a chopping waveform indicated as CR in FIG. 9, carries out comparison operation between its CR and ac voltage reference values Vu1*, Vv1* and Vw1* calculated in current control unit 8, and outputs PWM signals to power converter 2. Therefore, it is necessary for the current control unit 8 to execute its processing of dqACR at a speed of switching cycle of $T_{PWM}$ at which the power device is operated, for example, in case the switching frequency is 10 KHz, $T_{PWM}$=100 μs within which ac voltage reference values Vu1*, Vv1* and Vw1* must be calculated. By way of example, Vu1*(n) calculated from dqACR(n) which was calculated at a time (n) is set in PWM signal generator 9 in a subsequent time slit to produce PWM signal U(n) as shown in FIG. 9.

Processing of IREF(n) in current reference generator 7 for calculating current reference values Id*, Iq* and the like which are necessary for the processing of current control unit 8 is divided into two parts of IREF1(n) and IREF2(n) to be processed at a longer cycle than the processing cycle of current control unit 8.

An adequate sampling cycle for current reference generator 7 may be in a range of several ms to be able to respond to the torque reference value 61 output from torque reference generator 6 in order to ensure a target torque response required for responding to vehicle signals such as a gearshift signal which depends on the driver's dynamic responsiveness, and which is to be executed, for example, in a range of several tens ms. Further, a motor speed (N) from the viewpoint of motor 3 is defined as follows, $N = 120 \times f/P$ (number of poles), assuming that P is 8 in the case of synchronous motor, and a required maximum speed is 15760 rev./min, then there holds that Hz=15760×8/120=1050 (Hz), thereby, a high frequency control over 1 KHz substantially exceeding the commercial frequency range of 50 Hz is required, thus, a high frequency inverter is utilized.

Further, at the time when the processing capability of microcomputer 50 is substantially improved, torque reference generator 6 which is enclosed within dotted lines in FIG. 1 can be adapted to be processed by microcomputer 50 as well.

As have been described above, respective units in the control apparatus are divided into two parts in respect of their process cycles: one which depends on an electronic switching cycle of power devices; and the other which depends on a human dynamic responsive cycle of the driver of the vehicle so that they can be separately processed on each arithmetic unit, namely, processing of the control apparatus demanding electronic speed can be executed on one arithmetic unit, thereby it becomes possible to provide a compact and light-weight control apparatus which generates a drive signal to drive power devices in the power converter which supplies power to the ac motor to drive the electric vehicle.

Further, there is another advantage from the view point of the electric vehicle that the provision of a compact-size and light-weight drive unit including the motor and power converter necessary for driving the vehicle will substantially improve one charge distance range, and thus, attain further advancement toward actual application of the electric vehicle.

What is claimed is:

1. A control apparatus for controlling an electric vehicle having: ac motor for driving the electric vehicle; a power converter for supplying power to said ac motor, said power being generated on the basis of an output signal obtained responsive to a drive condition of the vehicle and a speed of the motor; a control unit for generating a drive signal to actuate power devices in said power converter; and a torque reference generating means for generating a torque reference value for said motor to generate from the output signal obtained responsive to the drive condition of the vehicle and the speed of the motor, said control apparatus comprising:

current reference generating means for calculating in response to said torque reference value a d-axis exciting current reference value according to which a magnetic flux of said motor is to be generated, and a q-axis torque current reference value, said d-axis and said q-axis being orthogonal to each other; and current control means for generating ac voltage reference values Vu*, Vv* and Vw* from said d-axis exciting current reference value and said q-axis torque current reference value; and wherein said current reference generating means and said current control means are processed digitally by one and the same arithmetic unit.

2. A control apparatus for controlling an electric vehicle according to claim 1, wherein said current reference generating means operates at a frequency dependent on behavior characteristics of an operator, and wherein said current control means, which generates the drive signal for the power converter, operates at a faster frequency than said frequency of said current reference generating means.

3. A control apparatus for controlling an electric vehicle according to claim 2 wherein said current reference generating means is processed at a cycle speed which is slower than a process cycle of said current control means, more specifically at a fraction of a cycle of a target response time constant of the ac motor with respect to said torque reference value.

4. A control apparatus for controlling an electric vehicle according to claim 2 wherein said current control means is processed at a cycle speed in synchronism with a drive signal cycle of the power devices, or at a multiplied cycle thereof or at a fraction of the drive signal cycle.

5. A control apparatus for controlling an electric vehicle having: ac motor for driving the electric vehicle; a power converter for supplying power to said ac motor, said power being generated on the basis of an output signal obtained responsive to a drive condition of the vehicle and a speed of the motor; a control unit for generating a drive signal to actuate power devices in said power converter; and a torque reference generating means for generating a torque reference value for said motor to generate from the output signal obtained responsive to the drive condition of the vehicle and the speed of the motor, said control apparatus comprising:

current reference generating means for calculating in response to said torque reference value a d-axis exciting current reference value according to which a magnetic flux of said motor is to be generated, and a q-axis torque current reference value, said d-axis and said q-axis being orthogonal to each other;

current control means for generating ac voltage reference values Vu*, Vv* and Vw* from said d-axis exciting current reference value and said q-axis torque current reference value;

wherein said current reference generating means and said current control means are processed digitally by one arithmetic unit;

further wherein said current control means comprises:

three-to-two phase converting means for calculating d-axis and q-axis currents for deriving each feedback value from a motor current relative to the d-axis exciting current references value and the q-axis torque current reference value;

d-axis exciting current control means for calculating a d-axis exciting voltage reference value from a difference between said d-axis exciting current reference value and said d-axis exciting current of feedback;

q-axis torque current control means for calculating each q-axis torque voltage reference value from a difference between said q-axis torque current reference value and said q-axis torque current of feedback;

two-to-three phase converting means for converting said d-axis exciting voltage reference value and said q-axis torque voltage reference value into each ac voltage reference value;

d-axis and q-axis voltage compensating means for compensating said d-axis exciting voltage reference value and said a-axis torque voltage reference value;

ac voltage compensating means for compensating said ac voltage reference value; and wherein phase angle θ which is necessary for the two-to-three phase converting means and the three-to-two phase converting means is supplied from phase compensating means in which primary angular frequency ω1 calculated in ω1 calculating means is integrated to produce θ.

\* \* \* \* \*